US012786640B2

(12) United States Patent
Mögelin

(10) Patent No.: US 12,786,640 B2
(45) Date of Patent: Nov. 3, 2026

(54) AUDIO ASSEMBLY WITH ACOUSTICAL MASS FOR HEARING DEVICES

(71) Applicant: Sonion Nederland B.V., Hoofddorp (NL)

(72) Inventor: Raymond Mögelin, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 35 days.

(21) Appl. No.: 18/875,446

(22) PCT Filed: Jul. 14, 2023

(86) PCT No.: PCT/EP2023/069617
§ 371 (c)(1),
(2) Date: Dec. 16, 2024

(87) PCT Pub. No.: WO2024/017783
PCT Pub. Date: Jan. 25, 2024

(65) Prior Publication Data
US 2026/0214394 A1 Jul. 23, 2026

(30) Foreign Application Priority Data
Jul. 21, 2022 (EP) .................................... 22186238

(51) Int. Cl.
*H04R 25/00* (2006.01)
*H04R 1/10* (2026.01)
*H04R 1/28* (2006.01)

(52) U.S. Cl.
CPC ........... *H04R 25/48* (2013.01); *H04R 1/1075* (2013.01); *H04R 1/2811* (2013.01); *H04R 1/2896* (2013.01); *H04R 25/604* (2013.01)

(58) Field of Classification Search
CPC .................. H04R 25/48; H04R 1/1075; H04R 1/2811; H04R 1/2896; H04R 25/604
(Continued)

(56) References Cited

U.S. PATENT DOCUMENTS

2010/0254556 A1 10/2010 Warren et al.
2013/0315431 A1* 11/2013 Grinker .................... H04R 1/24 381/380
(Continued)

FOREIGN PATENT DOCUMENTS

EP 1871141 B1 8/2012
EP 3637799 A1 4/2020
(Continued)

OTHER PUBLICATIONS

International Search Report for International Application No. PCT/EP2023/069617 dated Oct. 24, 2023.
(Continued)

*Primary Examiner* — Sean H Nguyen
(74) *Attorney, Agent, or Firm* — Harness, Dickey & Pierce, P.L.C.

(57) ABSTRACT

The present invention relates to an audio assembly for a hearing device, said audio assembly comprising 1) a nozzle comprising a sound channel and a sound outlet acoustically connected to the sound channel, wherein the sound channel, in a plan essentially perpendicular to a longitudinal axis of the sound channel, has a cross-sectional area, $A_N$, limited by a sound channel wall, and 2) a miniature receiver at least partly positioned in the sound channel, wherein the miniature receiver, in a plan essentially perpendicular to a longitudinal axis of the miniature receiver, has a cross-sectional area, $A_R$, defined by a housing of the miniature receiver, and wherein the housing of the miniature receiver comprising a sound output port and a venting opening, wherein the longitudinal axes of the sound channel and the miniature receiver are essentially parallel when the miniature receiver is at least partly positioned in the sound channel, and wherein the cross-sectional area, $A_N$, of the sound channel exceeds the cross-sectional area, $A_R$, of the miniature receiver, and wherein the excess cross-sectional area of the
(Continued)

sound channel forms an acoustical passage defining an acoustical mass between a part of the sound channel wall and an outer housing part of the miniature receiver, and wherein the acoustical passage extends in the direction of the longitudinal axis of the sound channel, and wherein the acoustical passage is acoustically connected to the sound outlet of the nozzle and to the sound output port of the miniature receiver whereby the acoustical passage is arranged between the sound outlet of the nozzle and the sound output port of the miniature receiver. The present invention further relates to hearing device comprising an audio assembly.

17 Claims, 16 Drawing Sheets

(58) Field of Classification Search
USPC .......................................................... 381/328
See application file for complete search history.

(56) References Cited

U.S. PATENT DOCUMENTS

2020/0204929 A1* 6/2020 Zurbruegg ........... H04R 25/456
2021/0051410 A1 2/2021 Palmer et al.
2021/0166674 A1* 6/2021 McCutcheon ... G10K 11/17881
2021/0360350 A1 11/2021 Meng et al.

FOREIGN PATENT DOCUMENTS

EP 2523470 B1 12/2020
EP 3806495 A1 4/2021

OTHER PUBLICATIONS

Written Opinion for International Application No. PCT/EP2023/069617 dated Oct. 24, 2023.
International Preliminary Report on Patentability for International Application No. PCT/EP2023/069617 dated Oct. 31, 2024.

* cited by examiner

AUDIO ASSEMBLY WITH ACOUSTICAL MASS FOR HEARING DEVICES

CROSS-REFERENCE TO RELATED APPLICATIONS

This application is a national phase under 35 U.S.C. § 371 of PCT International Application No. PCT/EP2023/069617 which has an International filing date of Jul. 14, 2023, which claims priority to European Application No. 22186238.6, filed Jul. 21, 2022, the entire contents of each of which are hereby incorporated by reference.

FIELD OF THE INVENTION

The present invention relates to an audio assembly for a hearing device wherein an excess cross-sectional area of a sound channel of a nozzle forms an acoustical passage defining an acoustical mass between a part of a sound channel wall and an outer housing part of a miniature receiver at least partly arranged in the sound channel of the nozzle, and wherein the acoustical passage is acoustically connected to a sound outlet of the nozzle and to a sound output port of the miniature receiver.

BACKGROUND OF THE INVENTION

Modern hearing devices are very compact devices. In order to implement such compact devices, the components of hearing devices, as well as the arrangement of these components inside the hearing devices, should be optimized with respect to the available space with modern hearing devices. Despite the constraints given with respect to the available space, the acoustical sensitivity and bandwidth are important characteristics of modern hearing devices. In order to optimize these characteristics, the fundamental acoustical resonance peak of hearing devices should be properly positioned within the audible frequency band. In the hearing aid industry, the term "receiver" is commonly used to refer to a sound generating device, i.e. a speaker. A miniature receiver is adapted to be used in hearing devices, and for that reason the miniature receiver is very small. Typical dimensions (length×width×height) are 6-9 mm in length, 3-4 mm in width, and around 1.5-2.5 mm in height.

Various arrangements have been suggested to optimize the acoustical performance of receivers, cf. for example US 2010/254556 A1 where an acoustical channel is formed in an outer surface of the housing of the receiver. The solution suggested in US 2010/254556 A1 is though disadvantageous for several reasons. Firstly, the incorporation of the acoustical channel in the outer surface of the housing of the receiver increases the complexity of the receiver. Secondly, the incorporation of the acoustical channel also increases the overall size of the receiver. Another prior art example is EP 2 523 470 B1—however this reference does not address how an acoustical passage is formed when a miniature receiver is inserted into a sound channel of a nozzle.

It may therefore be seen as an object of embodiments of the present invention to provide a simple and compact audio assembly comprising a miniature receiver for a hearing device that increases the bandwidth of the hearing device when incorporated therein.

DESCRIPTION OF THE INVENTION

The above-mentioned object is complied with by providing, in a first aspect, an audio assembly for a hearing device, said audio assembly comprising 1) a nozzle comprising a sound channel and a sound outlet acoustically connected to the sound channel, wherein the sound channel, in a plan essentially perpendicular to a longitudinal axis of the sound channel, has a cross-sectional area, $A_N$, limited by a sound channel wall, and
2) a miniature receiver at least partly positioned in the sound channel, wherein the miniature receiver, in a plan essentially perpendicular to a longitudinal axis of the miniature receiver, has a cross-sectional area, $A_R$, defined by a housing of the miniature receiver, and wherein the housing of the miniature receiver comprising a sound output port and a venting opening wherein the longitudinal axes of the sound channel and the miniature receiver are essentially parallel when the miniature receiver is at least partly positioned in the sound channel, and wherein the cross-sectional area, $A_N$, of the sound channel exceeds the cross-sectional area, $A_R$, of the miniature receiver, and wherein the excess cross-sectional area of the sound channel forms an acoustical passage defining an acoustical mass between a part of the sound channel wall and an outer housing part of the miniature receiver, and wherein the acoustical passage extends in the direction of the longitudinal axis of the sound channel, and wherein the acoustical passage is acoustically connected to the sound outlet of the nozzle and to the sound output port of the miniature receiver whereby the acoustical passage is arranged between the sound outlet of the nozzle and the sound output port of the miniature receiver.

Thus, the present invention relates to an audio assembly, which typically forms part of a hearing device, where a miniature receiver is arranged in the nozzle of a hearing device. In order to fit into the nozzle the miniature receiver may be arranged length wise in the nozzle of a hearing device. Establishing the acoustical passage with the acoustical mass between the sound outlet of the nozzle and the sound output port of the miniature receiver is advantageous in that it facilitates that a fundamental acoustical resonance peak at around 6-8 kHz may be provided due to the acoustical mass of the narrower acoustical passage between the sound channel wall and an outer housing part of the miniature receiver. A fundamental acoustical resonance peak at around 6-8 kHz due to the acoustical mass of the acoustical passage is advantageous in that it facilitates an increased bandwidth of the hearing device when the audio assembly is incorporated therein.

The bandwidth of the hearing device may be defined as usable bandwidth, for example by setting an upper frequency limit of the bandwidth to the frequency at which the receiver output drops below 5 dB relative to the receiver output at a reference frequency, e.g. 1 kHz. Doing so, the usable bandwidth may be in the range of 8-10 kHz. The acoustical mass that is required to achieve a certain resonance frequency depends on the acoustical compliance of the front volume. For example, with a front volume of 5 $mm^3$, the acoustical mass should be between 11000 and 20000 $kg/m^4$ in order to reach a resonance peak between 6 and 8 kHz. Alternatively, in order to have a resonance peak of 7 kHz with a front volume between 3 and 7 $mm^3$ the acoustical mass should be between 10000 and 24000 $kg/m^4$.

The acoustical passage is advantageously established via the difference in the cross-sectional area, $A_N$, of the sound channel and the cross-sectional area, $A_R$, of the miniature receiver. The difference in the cross-sectional areas may vary along the length of the acoustical passage meaning that the acoustical properties of acoustical passage may necessarily not be constant. For example, the difference in the cross-sectional areas may be stepped along the length of the acoustical passage.

In terms of numbers the sound channel may have a cross-sectional area, $A_N$, in the range of 6-13 mm$^2$, whereas the miniature receiver may have a cross-sectional area, $A_R$, in the range of 5-10 mm$^2$.

The cross-sectional area (without miniature receiver), $A_N$, of the sound channel is configured to exceed the cross-sectional area, $A_R$, of the miniature receiver such that the excess cross-sectional area of the sound channel forms an acoustical passage between a part of the sound channel wall and an outer housing part of the miniature receiver. The acoustical passage defines an acoustical mass.

In one embodiment, $A_N$-$A_R$ (substantially) defines the excess cross-sectional area of the sound channel forming an acoustical passage defining the acoustical mass. In another embodiment, the cross-sectional area $A_N$ for a given $A_R$ is (substantially) larger than would be required to define a desired acoustical mass, for example up to 3 mm$^2$ larger, typically 0.1 to 3 mm$^2$ larger than would be required to define a desired acoustical mass. For purposes of ease of manufacturing, it may be desired to insert a miniature receiver into an 'oversized' sound channel and fix the miniature receiver into the sound channel by means of an adhesive or sealant, such as a suitable glue, polymer film or viscoelastic substance. The excess cross-sectional area of the sound channel forms an acoustical passage defining an acoustical mass between a part of the sound channel wall; an outer housing part of the miniature receiver; and any part, such as an adhesive or sealant, for affixing the miniature receiver into the sound channel.

In order to fit into the nozzle, the miniature receiver preferably has an overall oblong shape where at least a first and a second oblong housing part form the housing of the miniature receiver.

The sound output port of the miniature receiver may be arranged in a first oblong housing part being essentially parallel to the longitudinal axis of the miniature receiver. The sound output port may be acoustically connected to a front volume of the miniature receiver. The venting opening of the miniature receiver may be arranged in a second oblong housing part being essentially parallel to the longitudinal axis of the miniature receiver. The venting opening is adapted to vent a rear volume of the miniature receiver. The venting of the rear volume of the miniature receiver may be provided into an additional rear volume being at least partly defined by a housing of the hearing device comprising the audio assembly. An advantage of an additional rear volume is that the output of the miniature receiver, i.e. the sound pressure level (SPL), can be increased relative to a receiver without the additional rear volume at the same drive level. The venting of the rear volume of the miniature receiver may also be provided into an additional channel (partly defined by a housing of the hearing device) that leads to the open air outside, i.e. the exterior, of the hearing device.

The venting opening may comprise an acoustical filter element forming an acoustical filter having an acoustical resistance, such as an acoustical low-pass filter having an acoustical resistance in the range of 1-5 GPa·s/m$^3$.

The cut-off frequency of such an acoustical low-pass filter may be in range of 100-1000 Hz, such as 200-800 Hz, and the acoustical low-pass filter may be implemented as a mesh comprising one or more small holes (drilled or laser-cut), wire mesh, grid, fabric, non-woven fabric or another arrangement with similar acoustical properties. The purpose of the acoustical filter is to allow the rear volume of the miniature receiver to be vented for signal frequencies below the filter cut-off, and to inhibit venting for frequencies above the cut-off. The advantage of such a filter is that the low frequency output is increased, while the resonance frequencies are not affected by the additional volume. The main property of the acoustical filter is the acoustical resistance. The acoustical resistance of the acoustical filter that is required to achieve a certain cut-off frequency is dependent of the acoustical compliance of the rear volume. For example, with a rear volume of 25 mm$^3$, the acoustical resistance should be between 1.1 and 4.5 GPa·s/m$^3$ in order to have the cut-off between 200 and 800 Hz. Alternatively, in order to have a cut-off frequency of 500 Hz with a rear volume between 15 and 30 mm$^3$, the acoustical resistance of the acoustical filter should be between 1.3 and 3 GPa·s/m$^3$.

As already mentioned, the advantage of the additional rear volume is that the low-frequency output SPL can be increased. The increment depends on the size of the additional volume. The additional volume can be relatively small, i.e. in the same order of magnitude as the rear volume in the receiver housing which is typically in the range 30-80 mm$^3$. Alternatively, the entire inner volume of the hearing device may be used as an additional rear volume. A separated part of the hearing device housing of 80-200 mm$^3$ may also be used as an additional rear volume. The venting may also be done to the ambient of the hearing device so that the size of the additional rear volume is not restricted.

In principle, the miniature receiver may be any type of miniature receiver as long as its form factor allows it to be positioned in a nozzle of a hearing device. In one embodiment the miniature receiver comprises a hinged diaphragm and a voice coil secured thereto. In this embodiment the hinged diaphragm is adapted to deflect in response to a drive signal applied to the voice coil. Thus, when applying an audible drive signal with frequencies in the audible range to the voice coil the miniature receiver generates sound waves.

In the present context the term "hinged diaphragm" should be understood as a diaphragm that is hinged to for example a frame structure. The hinging of the diaphragm to for example a frame structure may be arranged in various ways, such as by applying one or more integrated hinges, applying one or more distinct and separate hinges and/or one or more film-based hinges.

The sound channel of the nozzle may have a substantially circular cross-sectional shape, and the miniature receiver may have a substantially rectangular cross-sectional shape. As already mentioned the cross-sectional shape of the nozzle may vary, both in size and shape, along the length of the sound channel. In terms of size the substantially circular cross-sectional area of the sound channel of the nozzle may be in the range of 6-13 mm$^2$. The miniature receiver may have a substantially rectangular cross-sectional area in the range of 5-10 mm$^2$.

For easy and convenient mounting, the miniature receiver may be positioned in the sound channel using an adaptor in the form of a distinct joiner element. The distinct joiner element may be attached to the sound channel wall and the miniature receiver housing via respective attachment elements. The attachment elements may comprise various arrangements including for example snap-fit attachment elements, press or press-fit attachment elements, click-on attachment elements and/or similar attachment elements. The distinct joiner element is advantageous in that it facilitates that the miniature receiver may be secured to and/or released from the nozzle in an easy and quick manner.

The miniature receiver may also be secured directly to the nozzle. To comply with this the miniature receiver may comprise one or more positioning elements in the form of one or more protruding wings and/or flanges that extend from the miniature receiver housing. The one or more protruding wings and/or flanges may be integrated with the miniature receiver, or they may be secured thereto. The one or more positioning elements are adapted to engage with the nozzle in order to ensure correct positioning of the miniature receiver in the sound channel of the nozzle.

In order to properly engage with the nozzle one or more tracks comprising respective fixation elements may be provided in the sound channel wall of the nozzle. The one or more tracks and fixation elements are adapted to engage with respective positioning elements of the miniature receiver in order to ensure correct positioning and fixation of the miniature receiver in the sound channel of the nozzle. Also this arrangement is advantageous in that it facilitates that the miniature receiver may be secured to and/or released from the nozzle in an easy and quick manner.

Alternatively or in combination therewith, the sound channel of the nozzle may be dimensioned and shaped so that the miniature receiver is fitted or press-fitted into its desired position in the sound channel. In this arrangement the nozzle and the miniature receiver are kept in a fixed relationship using resilient properties of the nozzle and/or the miniature receiver. Also this arrangement is advantageous in that it facilitates that the miniature receiver may be secured to and/or released from the nozzle in an easy and quick manner.

For proper functioning acoustical sealing may advantageously be provided between the sound channel and the additional rear volume. This acoustical sealing may be achieved by applying a sealing member in the form of a sealing material (e.g. an adhesive) between the receiver housing and the walls of the nozzle before, during or after assembly. In order to simplify the sealing process, a sealing member may be at least partly provided between the nozzle and the miniature receiver. The sealing member may at least be adapted to acoustically seal the sound output port from the venting opening. The sealing member may form an integral part of the miniature receiver, or the sealing member may be a distinct and separate member.

Again, a sealing material (e.g. an adhesive) may be applied between the receiver housing and the sealing member, and between the sealing member and the walls of the nozzle before, during or after assembly.

Moreover, a suspension member may be at least partly provided between the nozzle and the miniature receiver. The suspension member may at least be adapted to vibration isolate the miniature receiver from the nozzle. Thus, the suspension member is configured to prevent that mechanical vibrations generated by the miniature receiver are transferred to the nozzle. The suspension member may form an integral part of the miniature receiver. Alternatively, the suspension member may be a distinct and separate member.

In the above implementations of the audio assembly the acoustical mass may be in the range 8000-30000 $kg/m^4$, such as in the range 10000-25000 $kg/m^4$.

In a second aspect the present invention relates to a hearing device comprising an audio assembly according to the first aspect. The hearing device may in principle be any hearing device, such as hearables, earbuds, hearing aids etc. Thus, the hearing device may comprise a hearing aid, such as behind-the-ear (BTE), receiver-in-the-canal (RIC), in-the-ear (ITE), such as completely-in-canal (CIC) and invisible-in-canal (IIC).

In general, the various aspects of the present invention may be combined and coupled in any way possible within the scope of the invention. These and other aspects, features and/or advantages of the present invention will be apparent from and elucidated with reference to the embodiments described hereinafter.

BRIEF DESCRIPTION OF THE DRAWINGS

The present invention will now be described with reference to the accompanying drawings wherein.

DETAILED DESCRIPTION OF THE INVENTION

In general, the present invention relates to an audio assembly for a hearing device wherein an excess cross-sectional area of a sound channel of a nozzle forms an acoustical passage defining an acoustical mass. The acoustical passage is formed between a part of a sound channel wall and an outer housing part of a miniature receiver at least partly arranged in the sound channel of the nozzle. The acoustical passage is acoustically connected to a sound outlet of the nozzle and to a sound output port of the miniature receiver. With this arrangement the acoustical passage becomes arranged between the sound outlet of the nozzle and the sound output port of the miniature receiver. This arrangement is advantageous since it facilitates that a fundamental acoustical resonance peak at around 6-8 kHz may be provided. As already mentioned a fundamental acoustical resonance peak in this range is advantageous in that it facilitates an increased bandwidth of the hearing device when the audio assembly is incorporated therein.

Figure 1:
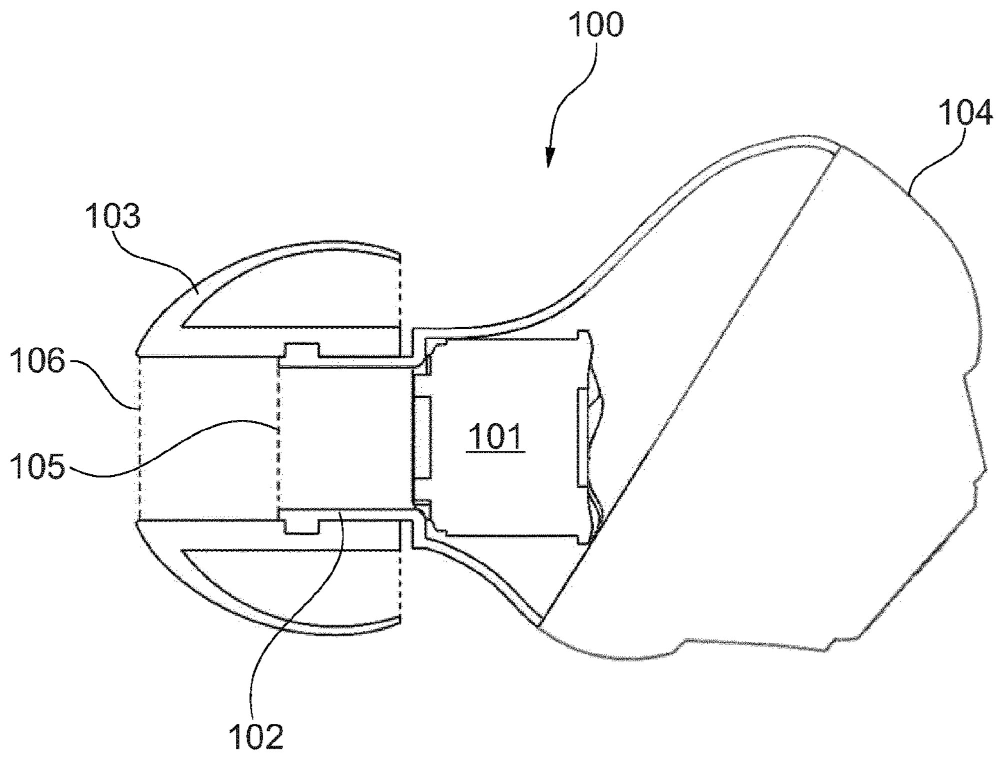
Fig. 1 (Prior Art)
FIG. 1 shows a cross-sectional side-view of a part of a prior art hearing device.

FIG. 1 depicts a hearing device 100 according to the prior art where a receiver 101 feeds sound into a nozzle 102 which is secured to a flexible dome 103 for positioning the hearing device 100 in the ear canal (not shown). The hearing device 100 further comprises a housing 104 which is also depicted in FIG. 1. The sound generated by the speaker/receiver 101 leaves the hearing device 100 via the sound outlet 105 of the nozzle 102 and the sound outlet 106 of the flexible dome 103.

Figure 2:
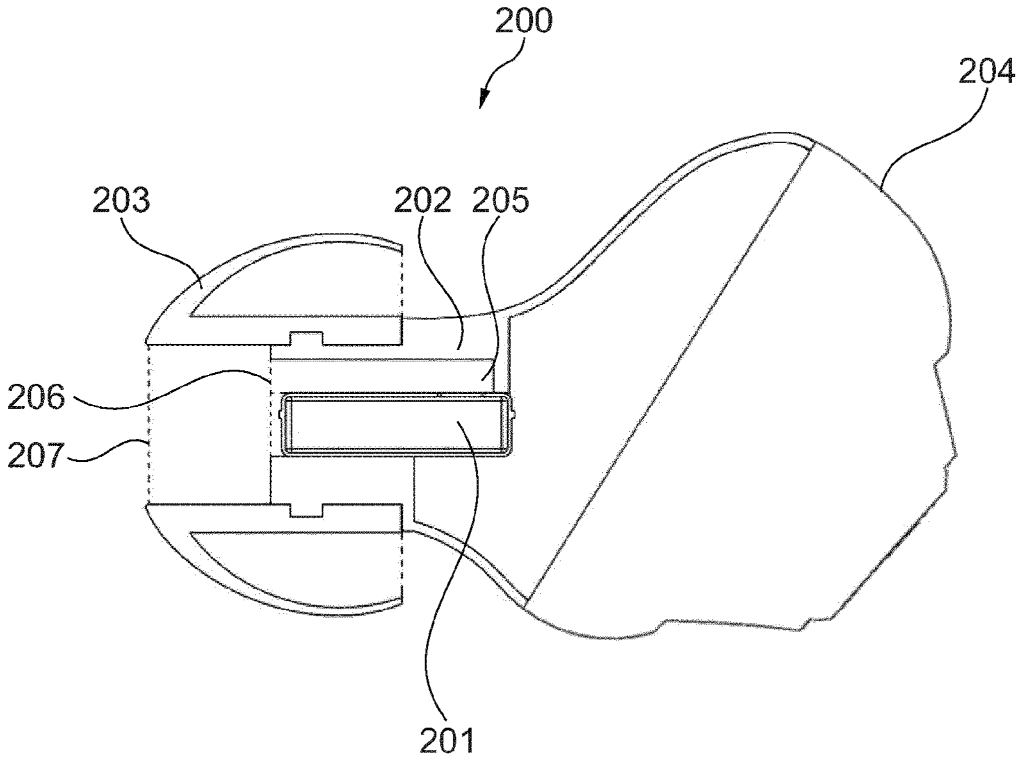
FIG. 2 shows a cross-sectional side-view of a part of a hearing device according to the present invention.

Turning now to FIG. 2 a hearing device 200 according to the present invention is depicted. Again, a nozzle 202 is secured to a flexible dome 203. Contrary to the prior art arrangement an oblong miniature receiver 201 is arranged in a sound channel of the nozzle 202. However, and as it will be discussed in further details below, the cross-sectional area of the sound channel of the nozzle 202 exceeds the corresponding cross-sectional area of the miniature receiver 201 whereby an acoustical passage 205 defining an acoustical mass is formed between a part of the sound channel wall and an outer housing part of the miniature receiver 201. The sound generated by the miniature receiver 201 leaves the hearing device 200 via a sound output port 208 of the miniature receiver 201, the acoustical passage 205, the sound outlet 206 of the nozzle 202 and the sound outlet 207 of the flexible dome 203. A part of the hearing device housing 204 is also depicted in FIG. 2.

The dimensions (length×width×height) of the oblong miniature receiver in FIG. 2 and the remaining figures is just a few millimeters, such as for example around 7×3.5×2 mm.

Figure 3:
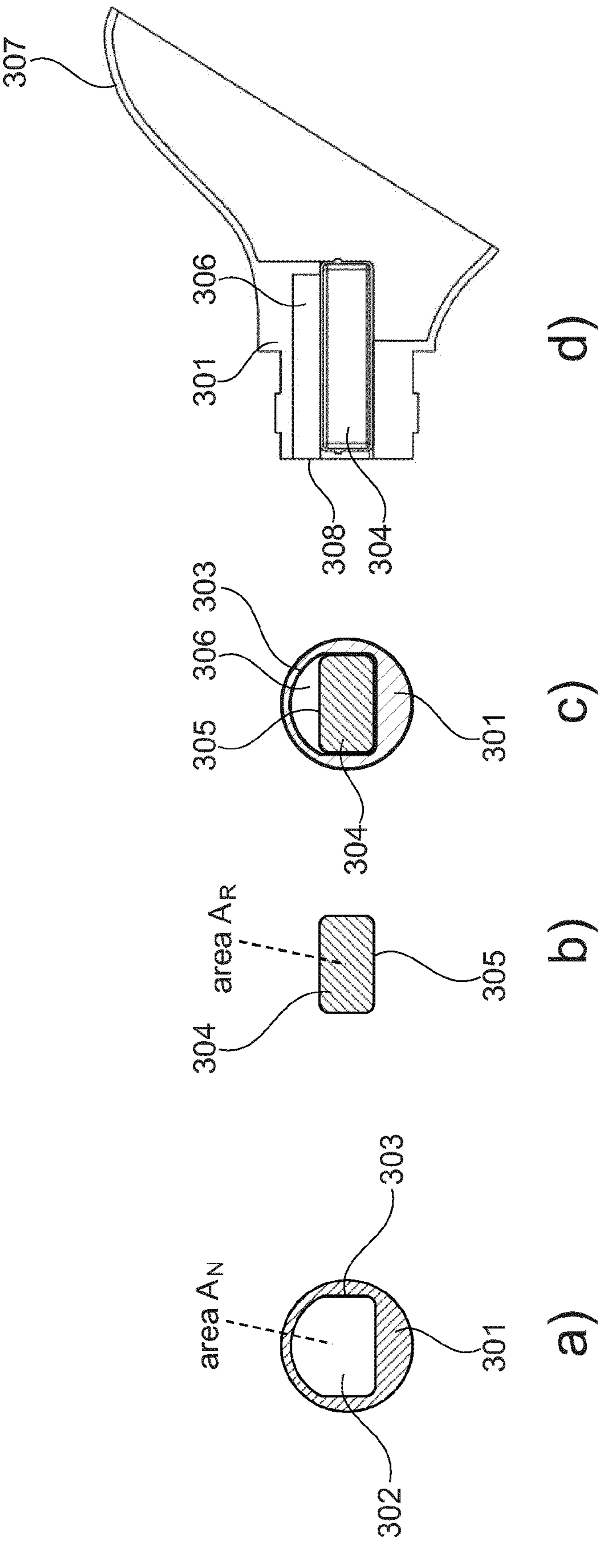
FIGS. 3*a-c* show cross-sectional end views of the nozzle and the miniature receiver.
FIG. 3*d* shows a cross-sectional side-view of a part of a hearing device.

FIGS. 3*a*-3*c* show various end cross-sectional views of the nozzle and the miniature receiver. Referring now to FIG. 3*a* a nozzle 301 comprising a sound channel 302 which, in a plan essentially perpendicular to a longitudinal axis of the sound channel 302, has a cross-sectional area, $A_N$, is depicted. The sound channel 302 is limited by a sound channel wall 303. FIG. 3*b* depicts a miniature receiver 304 which, in a plan essentially perpendicular to a longitudinal axis of the miniature receiver 304, has a cross-sectional area, $A_R$, defined by an outer housing part 305 of the miniature receiver 304. In FIG. 3*c* the miniature receiver 304 is positioned in the sound channel of the nozzle 301. As seen in FIG. 3*c* the excess cross-sectional area of the sound channel forms an acoustical passage 306 between a part of the sound channel wall 303 and an outer housing part 305 of the miniature receiver 304. FIG. 3*d* shows a cross-sectional side view of the miniature receiver 304 when arranged in the nozzle 301 thus defining the acoustical passage 306 having a sound outlet 308. Again, the sound generated by the miniature receiver 304 leaves the hearing device via a sound output port 309 of the miniature receiver 304, the acoustical passage 306 and the sound outlet 308 of the nozzle 301. A part of the hearing device housing 307 is also depicted in FIG. 3*d*.

Figure 4:
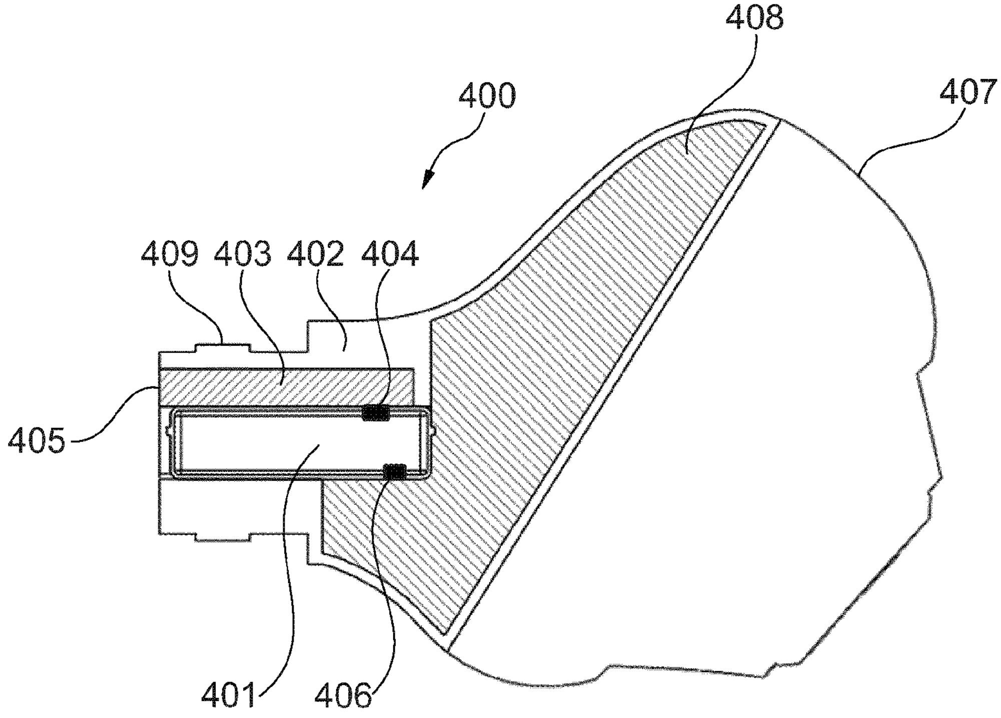
FIG. 4 shows a cross-sectional side-view of a part of a hearing device according to the present invention including the acoustical passage and a miniature receiver comprising a sound outlet port and a venting opening.

Turning now to FIG. 4 a hearing device 400 according to the present invention is depicted. Again, oblong miniature receiver 401 is arranged in a sound channel of the nozzle 402 where the cross-sectional area of the sound channel of the nozzle 402 exceeds the corresponding cross-sectional area of the oblong miniature receiver 401 whereby an acoustical passage 403 defining an acoustical mass is formed between a part of the sound channel wall and an outer housing part of the oblong miniature receiver 401. The sound generated by the oblong miniature receiver 401 leaves the hearing device 400 via the acoustical passage 403 and the sound outlet 405 of the nozzle 402. A part of the hearing device housing 407 is also depicted in FIG. 4. As seen in FIG. 4 the oblong miniature receiver 401 comprising a sound output port 404 and a venting opening 406 being acoustically connected to the acoustical passage 403 and the additional rear volume 408, respectively. The venting opening 406 is adapted to vent a rear volume of the miniature receiver 401, and the venting opening 406 comprises an acoustical filter element forming an acoustical filter, such as an acoustical low-pass filter. As already mentioned sound generated by the oblong miniature receiver 401, and leaving the miniature receiver 401 via a sound output port 404, passes the acoustical passage 403 and is thus exposed to the acoustical mass of the acoustical passage.

As already mentioned, the acoustical mass that is required to achieve a certain resonance frequency depends on the acoustical compliance of the front volume. For example, with a front volume of 5 $mm^3$, the acoustical mass should be between 11000 and 20000 $kg/m^4$ in order to reach a resonance peak between 6 and 8 kHz. Alternatively, in order to have a resonance peak of 7 kHz with a front volume between 3 and 7 $mm^3$ the acoustical mass should be between 10000 and 24000 $kg/m^4$.

FIGS. 5-10 all relate to various arrangements for positioning and securing the oblong miniature receiver in the nozzle of the audio assembly.

Figure 5:
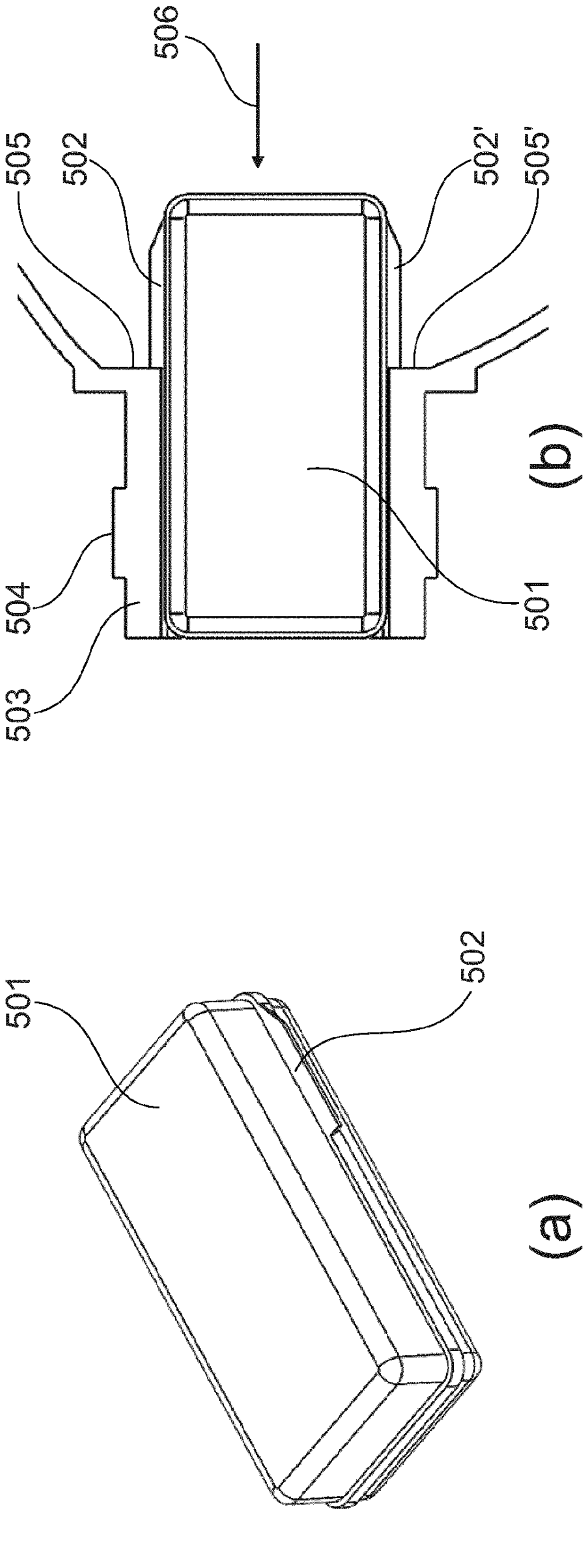
FIG. 5*a* shows an oblong miniature receiver with a pair of oppositely arranged flanges according to a first embodiment.
FIG. 5*b* shows the oblong miniature receiver positioned in the nozzle.

Referring now to FIG. 5*a* an oblong miniature receiver 501 with a pair of oppositely arranged flanges 502 (only one is visible) is depicted. In FIG. 5*b* the oblong miniature receiver 501 is at least partly arranged in the nozzle 503. As seen in FIG. 5*b* the oppositely arranged flanges 502, 502' abut the respective surface portions 505, 505' of the nozzle 503. With this arrangement the positioning of the oblong miniature receiver 501 with respect to the nozzle 503 is pre-set. The nozzle 503 comprises a protrusion 504 that is adapted to engage with a corresponding recess in the flexible dome (not shown) and thus secure the nozzle 503 to the flexible dome in a pre-set manner. In FIG. 5 the oblong miniature receiver 501 is moved into its final position by moving it from right to left as indicated by the arrow 506.

Figure 6:
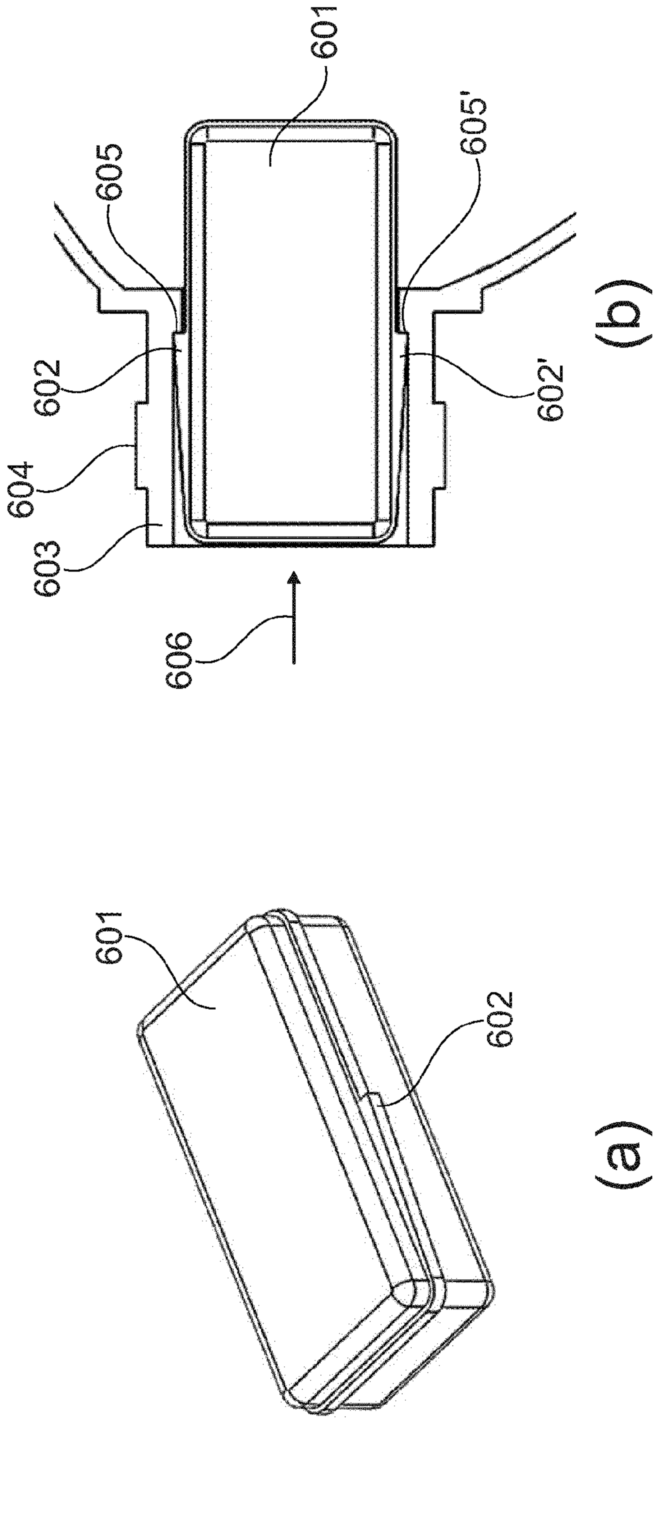
FIG. 6*a* shows an oblong miniature receiver with a pair of oppositely arranged flanges according to a second embodiment.
FIG. 6*b* shows the oblong miniature receiver positioned in the nozzle.

Turning now to FIG. 6*a* an oblong miniature receiver 601 also with a pair of oppositely arranged flanges 602 (only one is visible) is depicted. In FIG. 6*b* the oblong miniature receiver 601 is at least partly arranged in the nozzle 603. As seen in FIG. 6*b* the oppositely arranged flanges 602, 602' abut the respective edges 605, 605' of the nozzle 603. With this arrangement the positioning of the oblong miniature receiver 601 with respect to the nozzle 603 is pre-set. The nozzle 603 comprises a protrusion 604 that is adapted to engage with a corresponding recess in the flexible dome (not shown) and thus secure the nozzle 603 to the flexible dome in a pre-set manner. In FIG. 6 the oblong miniature receiver 601 is moved into its final position by moving it from left to right as indicated by the arrow 606.

Figure 7:
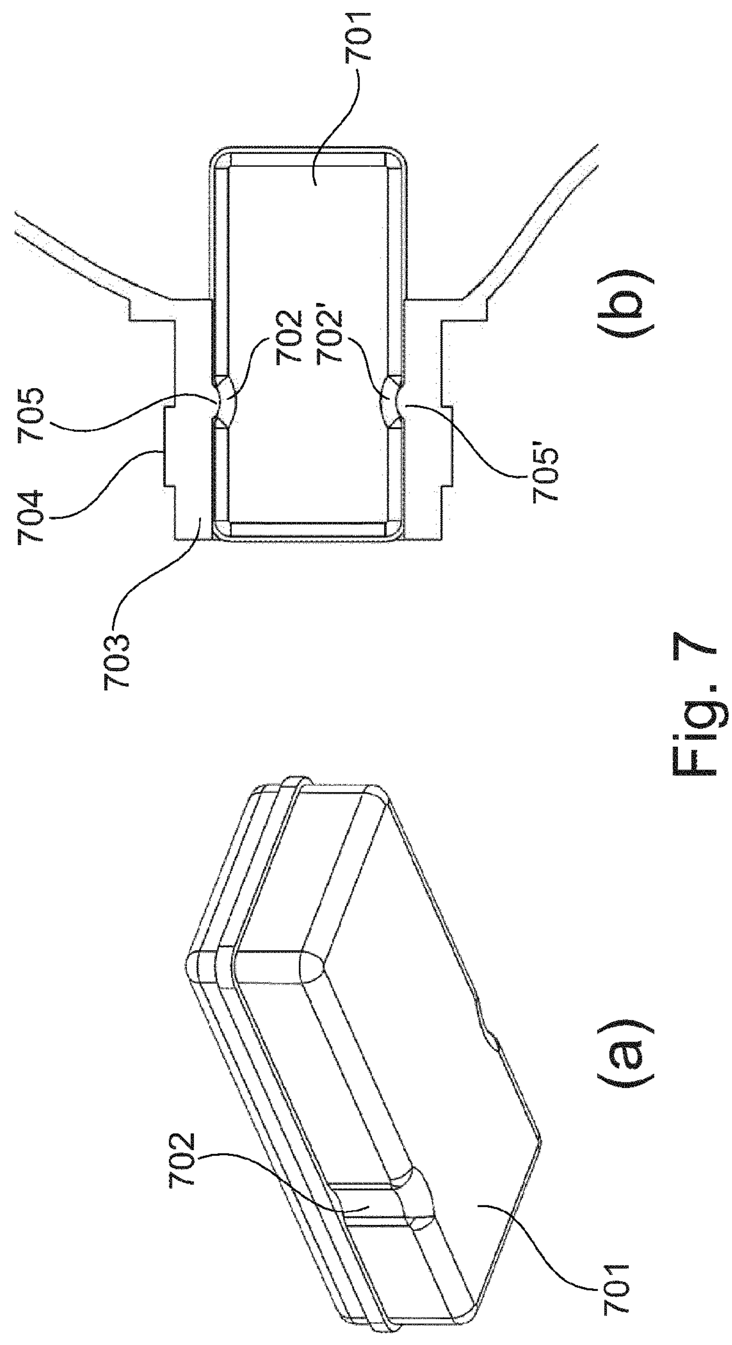
FIG. 7*a* shows an oblong miniature receiver with a pair of oppositely arranged notches.
FIG. 7*b* shows the oblong miniature receiver positioned in the nozzle.

In FIG. 7*a* an oblong miniature receiver 701 with a pair of oppositely arranged notches 702 (only one is visible) is depicted. In FIG. 7*b* the oblong miniature receiver 701 is at least partly arranged in the nozzle 703. As seen in FIG. 7*b* the oppositely arranged notches 702, 702' engage the respective cams 705, 705' of the nozzle 703. With this arrangement the positioning of the oblong miniature receiver 701 with respect to the nozzle 703 is pre-set. The nozzle 703 comprises a protrusion 704 that is adapted to engage with a corresponding recess in the flexible dome (not shown) and thus secure the nozzle 703 to the flexible dome in a pre-set manner. In FIG. 7 the oblong miniature receiver 701 may be moved into its final position by moving it from either left or right.

Figure 8:
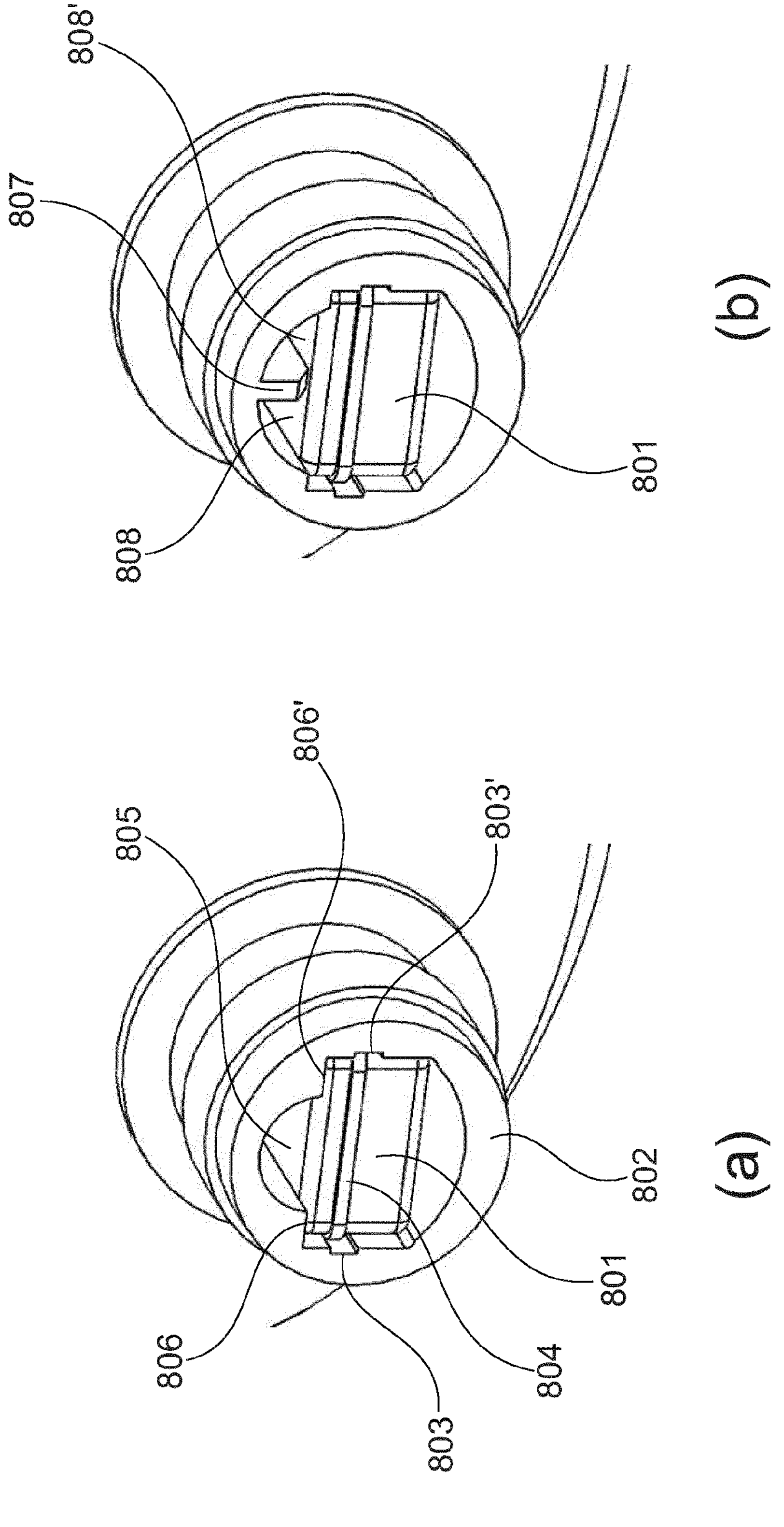
FIG. 8*a* shows an oblong miniature receiver arranged in tracks of the nozzle, and FIG. 8*b* also shows an oblong miniature receiver arranged in tracks of the nozzle where the acoustical passage is divided into two sections.

An end view of the oblong miniature receiver 801 arranged in the nozzle 802 is depicted in FIG. 8*a*. As seen in FIG. 8*a* two oppositely arranged tracks 803, 803' are arranged in the nozzle 802. These tracks 803, 803' engage with a protrusion 804 of the oblong miniature receiver 801. Moreover, the upper surface of the oblong miniature receiver 801 abuts the respective edges 806, 806' of nozzle 802 whereby the positioning of the oblong miniature receiver 801 with respect to the nozzle 802 is pre-set. The acoustical passage 805 is provided above the oblong miniature receiver 801. In FIG. 8*b* the acoustical passage is split into two passages 808, 808' by the nozzle protrusion 807 which also abuts and thus supports the oblong miniature receiver 801. The oblong miniature receiver 801 may further be supported by a (solid) body (not shown) in nozzle 802 to arrive at an effective sound channel area $A_N$ as depicted in FIG. 3*c*. The solid body may form an integral part of nozzle 802 or it may be a separate and discrete insert or sealant. Alternatively, the area within nozzle 802 depicted in FIGS. 8(*a*) and (*b*) (below miniature receiver 801) may be at least partly open and, according to one embodiment, form part of the sound channel.

Figure 9:
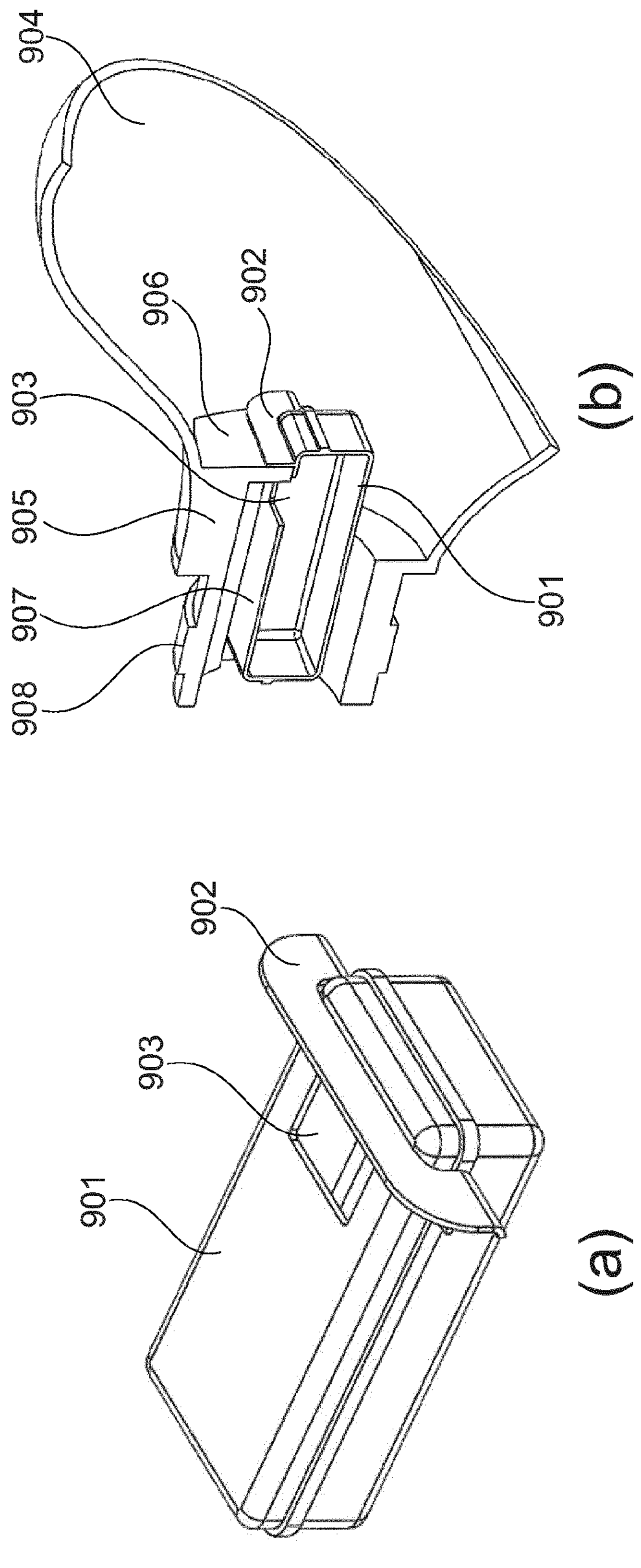
FIG. 9*a* shows an oblong miniature receiver with an end flange according to a first embodiment.
FIG. 9*b* shows the oblong miniature receiver positioned in the nozzle.

Turning now to FIG. 9*a* an oblong miniature receiver 901 comprising a flange 902 and sound outlet port 903 is depicted. In FIG. 9*b* the oblong miniature receiver 901 is arranged in the nozzle 905. As seen in FIG. 9*b* the flange 902 abuts the edge 906 of the nozzle 905 which thus forms a mechanical stop. With this arrangement the positioning of the oblong miniature receiver 901 with respect to the nozzle 905 is pre-set. The acoustical passage 907 is formed between the oblong miniature receiver 901 and the nozzle 905, and the sound outlet port 903 of the oblong miniature receiver 901 is acoustically connected to the acoustical passage 907. The nozzle 905 comprises a protrusion 908 that is adapted to engage with a corresponding recess in the flexible dome (not shown) and thus secure the nozzle 905 to the flexible dome in a pre-set manner. In FIG. 9 the oblong miniature receiver 901 is moved into its final position by inserting it from the side of the hearing device housing 904.

Figure 10:
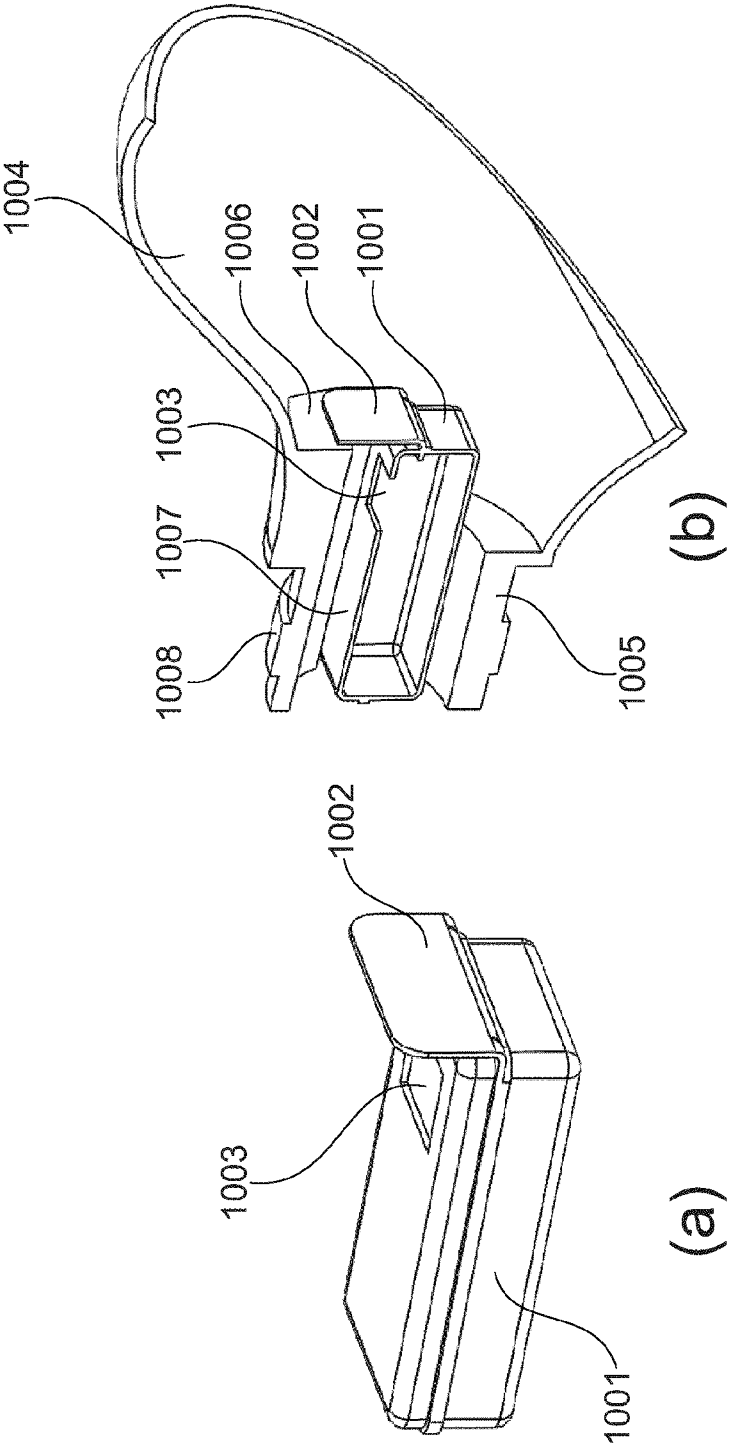
FIG. 10*a* shows an oblong miniature receiver with an end flange according to a second embodiment.
FIG. 10*b* shows the oblong miniature receiver positioned in the nozzle.

In FIG. 10*a* an oblong miniature receiver 1001 comprising a flange 1002 and sound outlet port 1003 is depicted. In FIG. 10*b* the oblong miniature receiver 1001 is arranged in the nozzle 1005. As seen in FIG. 10*b* the flange 1002 abuts the surface 1006 of the nozzle 905 which thus forms a mechanical stop. With this arrangement the positioning of the oblong miniature receiver 1001 with respect to the nozzle 1005 is pre-set. The acoustical passage 1007 is formed between the oblong miniature receiver 1001 and the nozzle 1005, and the sound outlet port 1003 of the oblong miniature receiver 1001 is acoustically connected to the acoustical passage 1007. The nozzle 1005 comprises a protrusion 1008 that is adapted to engage with a corresponding recess in the flexible dome (not shown) and thus secure the nozzle 1005 to the flexible dome in a pre-set manner. In FIG. 10 the oblong miniature receiver 1001 is moved into its final position by inserting it from the side of the hearing device housing 1004.

Figure 11:
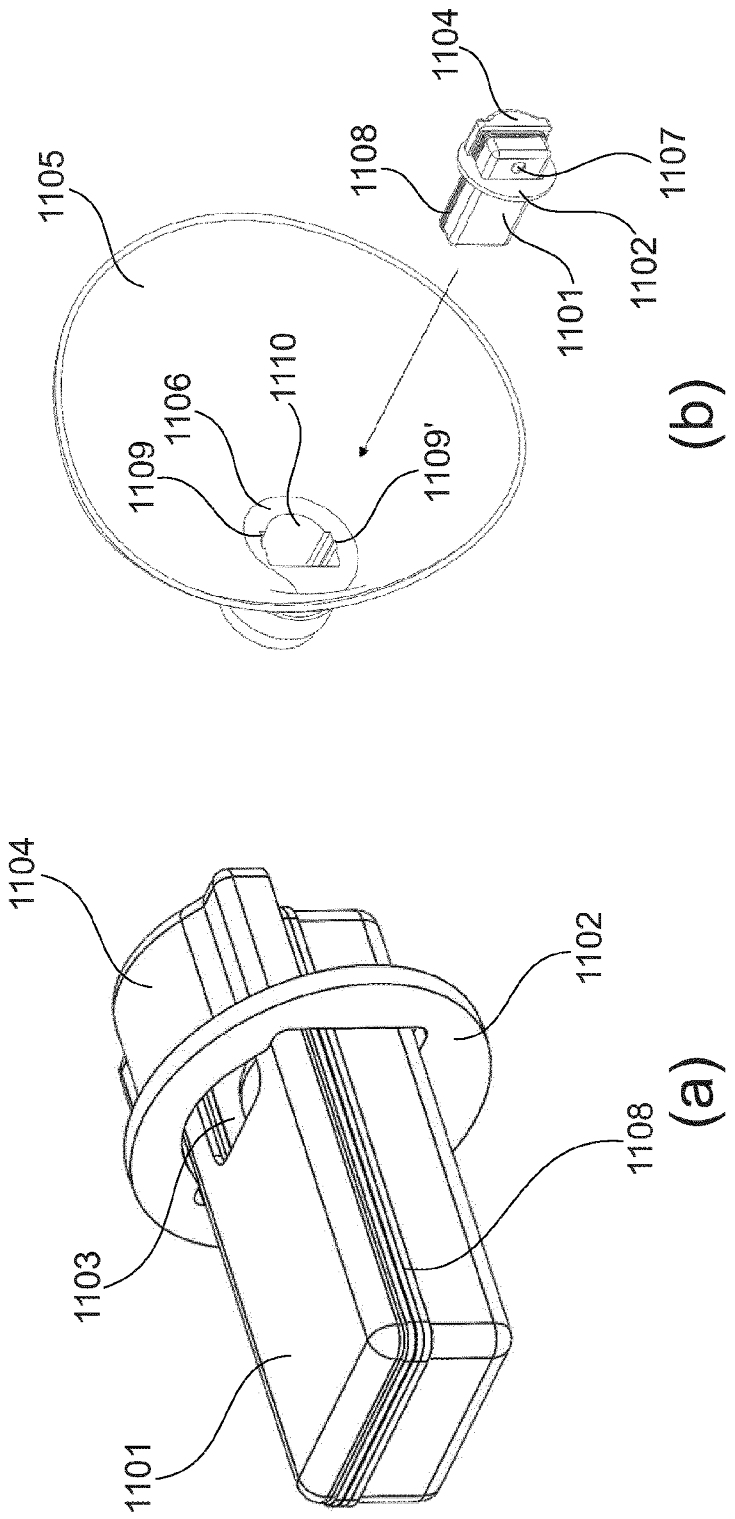
FIG. 11*a* shows an oblong miniature receiver arranged in a sealing element according to a first embodiment.
FIG. 11*b* shows how the oblong miniature receiver and the sealing element are to be positioned in the nozzle.
Figure 12:
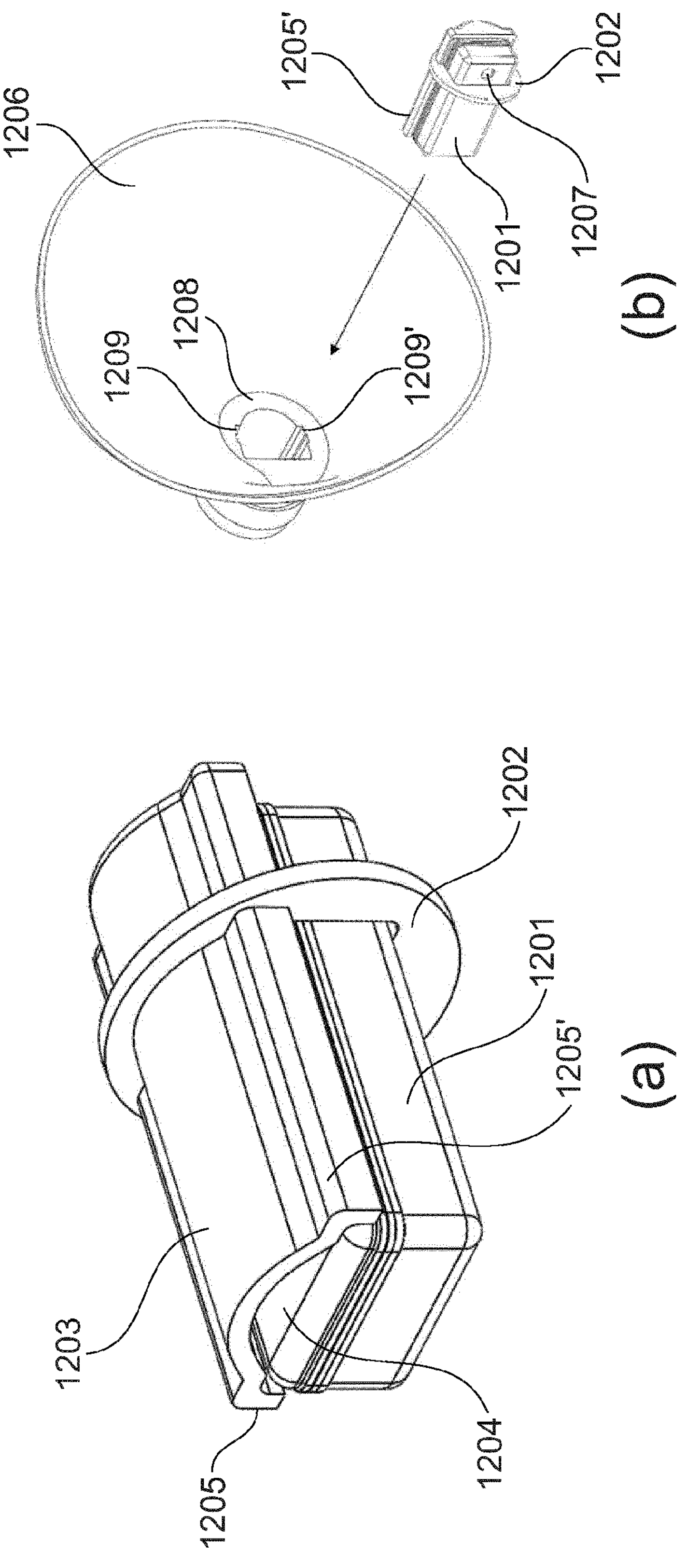
FIG. 12*a* shows an oblong miniature receiver arranged in a sealing element according to a second embodiment.
FIG. 12*b* shows how the oblong miniature receiver and the sealing element are to be positioned in the nozzle.

FIGS. 11 and 12 both relate to sealing arrangements between the oblong miniature receiver and the nozzle.

Referring now to FIG. 11*a* an oblong miniature receiver 1101 secured to a sealing element comprising a housing portion 1104 and flange 1102 is depicted. The oblong miniature receiver 1101 comprises a pair of oppositely arranged protrusions 1108 (only one is visible). The sealing element defines a volume above and around the sound outlet port 1103 of the oblong miniature receiver 1101. In FIG. 11*b* the oblong miniature receiver 1101 and the sealing element secured thereto is inserted into the nozzle 1106 having oppositely arranged recesses 1109, 1109' that are adapted to receive the respective protrusions 1108 of the oblong miniature receiver 1101. The flange 1102 of the sealing element is adapted to abut the nozzle 1106, and the volume above and around the sound outlet port 1103 of the oblong miniature receiver 1101 is adapted to be acoustically connected to the acoustical passage 1110 when the oblong miniature receiver 1101 is inserted in the nozzle 1106. As seen in FIG. 11*b* the oblong miniature receiver 1101 further comprises a venting opening 1107 which is acoustically sealed from the sound outlet port 1103 when the oblong miniature receiver 1101 is inserted in the nozzle 1106. A part of the hearing device housing 1105 is also depicted in FIG. 11*b*.

Referring now to FIG. 12*a* an oblong miniature receiver 1201 secured to another sealing element also comprising a housing portion 1203 and flange 1202 is depicted. The housing portion 1203 comprises a pair of oppositely arranged protrusions 1205, 1205'. The housing portion 1203 of the sealing element defines an acoustical passage between the sound outlet port (hidden and therefore not visible) of the oblong miniature receiver 1201 and the sound outlet 1204. In FIG. 12*b* the oblong miniature receiver 1201 and the sealing element secured thereto is inserted into the nozzle 1208 having oppositely arranged recesses 1209, 1209' that are adapted to receive the respective protrusions 1205, 1205' of the housing portion 1203. The flange 1202 of the sealing element is adapted to abut the nozzle 1208. As seen in FIG. 12*b* the oblong miniature receiver 1201 further comprises a venting opening 1207 which is acoustically sealed from the sound outlet port when the oblong miniature receiver 1201 is inserted in the nozzle 1208. A part of the hearing device housing 1206 is also depicted in FIG. 12*b*.

Figure 13:
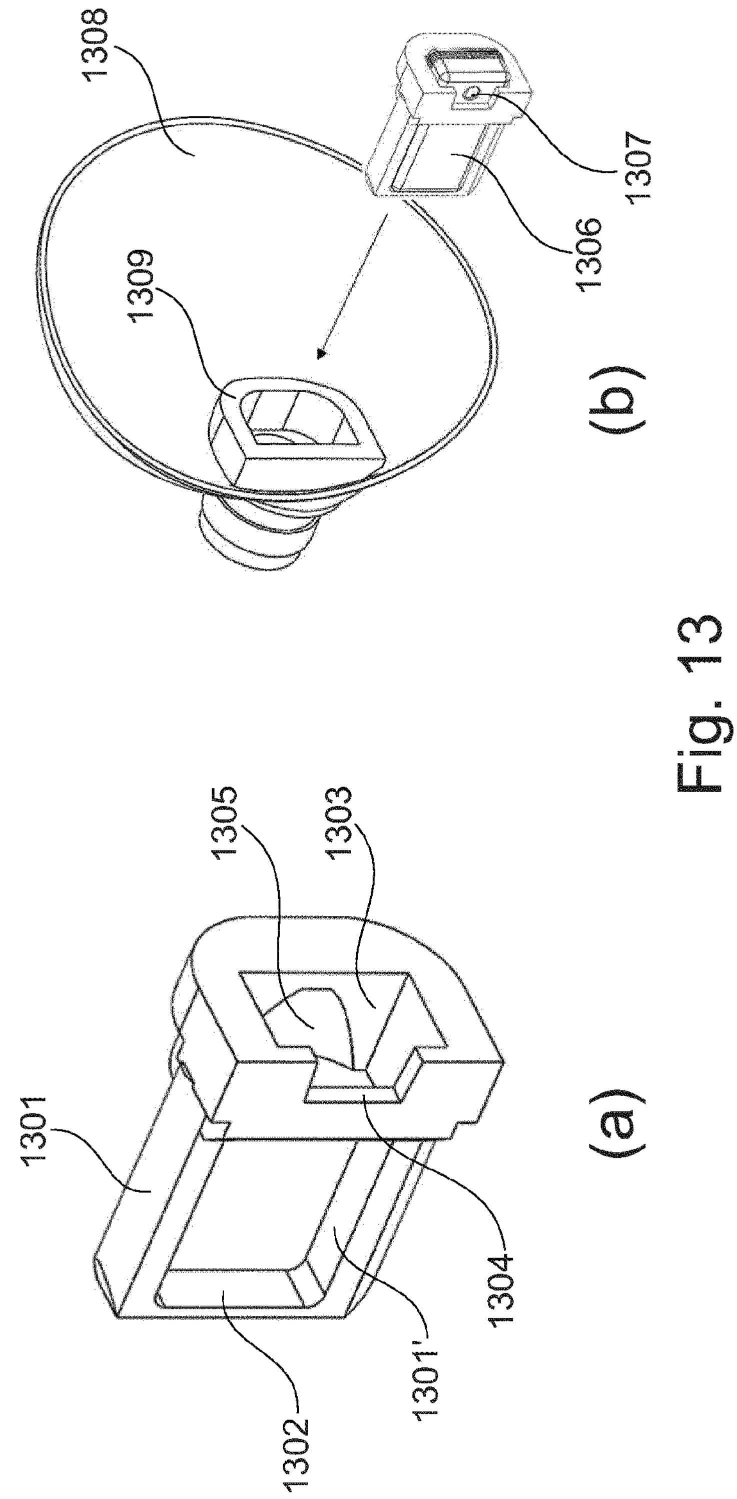
FIG. 13*a* shows an oblong miniature receiver arranged in a suspension member according to a first embodiment.
FIG. 13*b* shows how the oblong miniature receiver and the suspension member are to be positioned in the nozzle.
Figure 14:
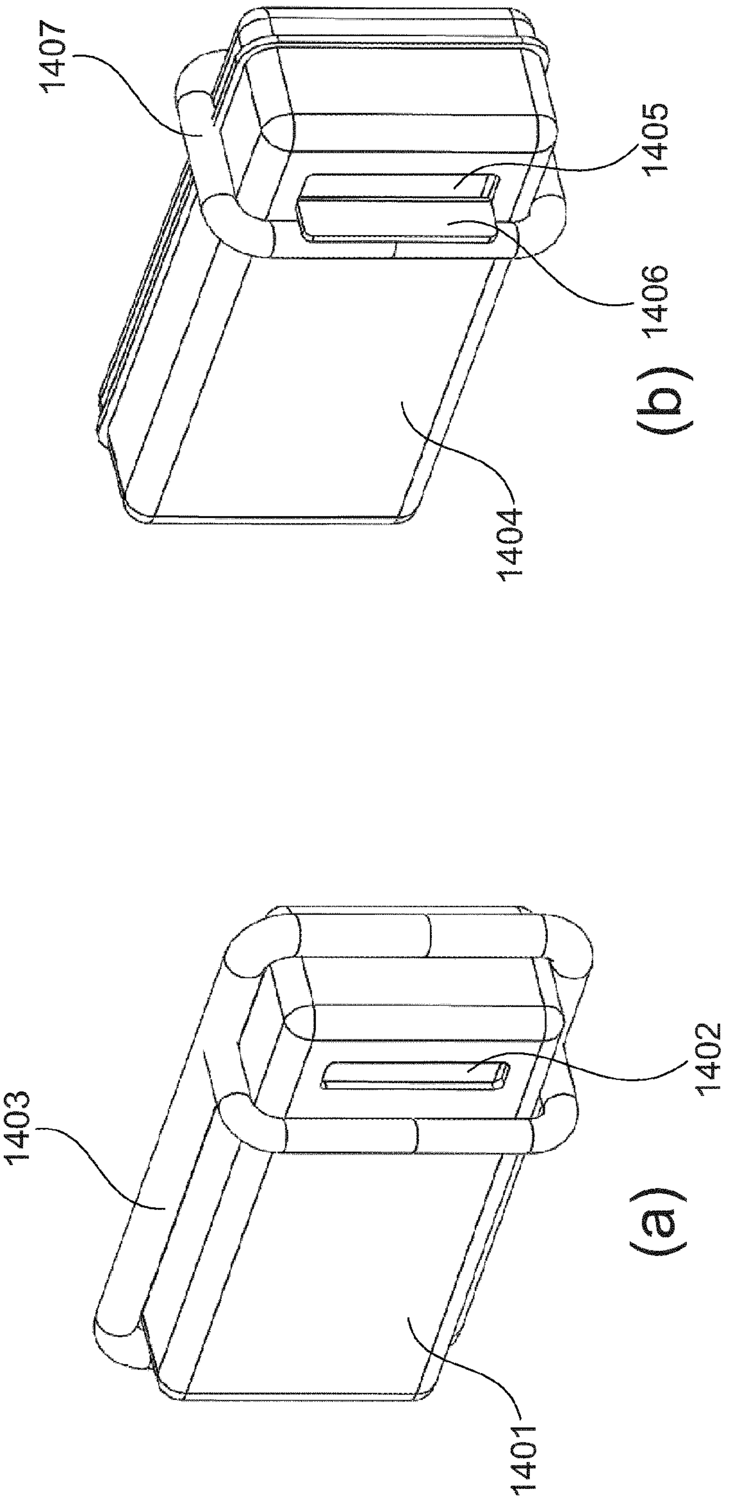
FIG. 14*a* shows an oblong miniature receiver arranged in a suspension member according to a second embodiment.
FIG. 14*b* shows how the oblong miniature receiver and the suspension member are to be positioned in the nozzle.

FIGS. 13 and 14 both relate to suspension arrangements between the oblong miniature receiver and the nozzle.

In FIG. 13*a* a suspension element for receiving an oblong miniature receiver (not shown) is depicted. The suspension element is manufactured of a vibration isolating material so that mechanical vibrations generated by the oblong miniature receiver are prevented from being spread to the remaining elements of the hearing device. As seen in FIG. 13*a* the suspension element comprises opposing side portions 1301, 1301' and an end portion 1302 that functions as a mechanical stop for the oblong miniature receiver when inserted in the suspension member. The suspension member further comprises an opening 1303 for receiving the oblong miniature receiver, and openings 1304 and 1305 that are to be aligned with the venting opening and the sound outlet port of the oblong miniature receiver, respectively. In FIG. 13*b* an oblong miniature receiver 1306 comprising a venting opening 1307 and a sound outlet port (not shown) is arranged in the suspension member. The suspension member is adapted to be inserted into the nozzle optionally via an adaptor 1309. A part of the hearing device housing 1308 is also depicted in FIG. 13*b*.

FIG. 14*a* shows an oblong miniature receiver 1401 comprising a venting opening 1402 and a sound outlet port (not shown) arranged in a tube-shaped suspension member 1403 of a vibration isolating material. The tube-shaped suspension member 1403 extends both in the longitudinal and the transverse directions of the oblong miniature receiver 1401. FIG. 14*b* shows an oblong miniature receiver 1404 also comprising a venting opening 1405 and a sound outlet port (not shown) arranged in another tube-shaped suspension member 1407 of a vibration isolating material. The tube-shaped suspension member 1407 extends in the transverse directions of the oblong miniature receiver 1404.

Although not explicitly depicted in relation to every embodiment the oblong miniature receiver comprises a sound outlet port acoustically connected to a acoustical passage, and a venting opening adapted to vent a rear volume of the miniature receiver. The venting opening typically comprises an acoustical filter element forming an acoustical filter, such as an acoustical low-pass filter.

Figure 15:
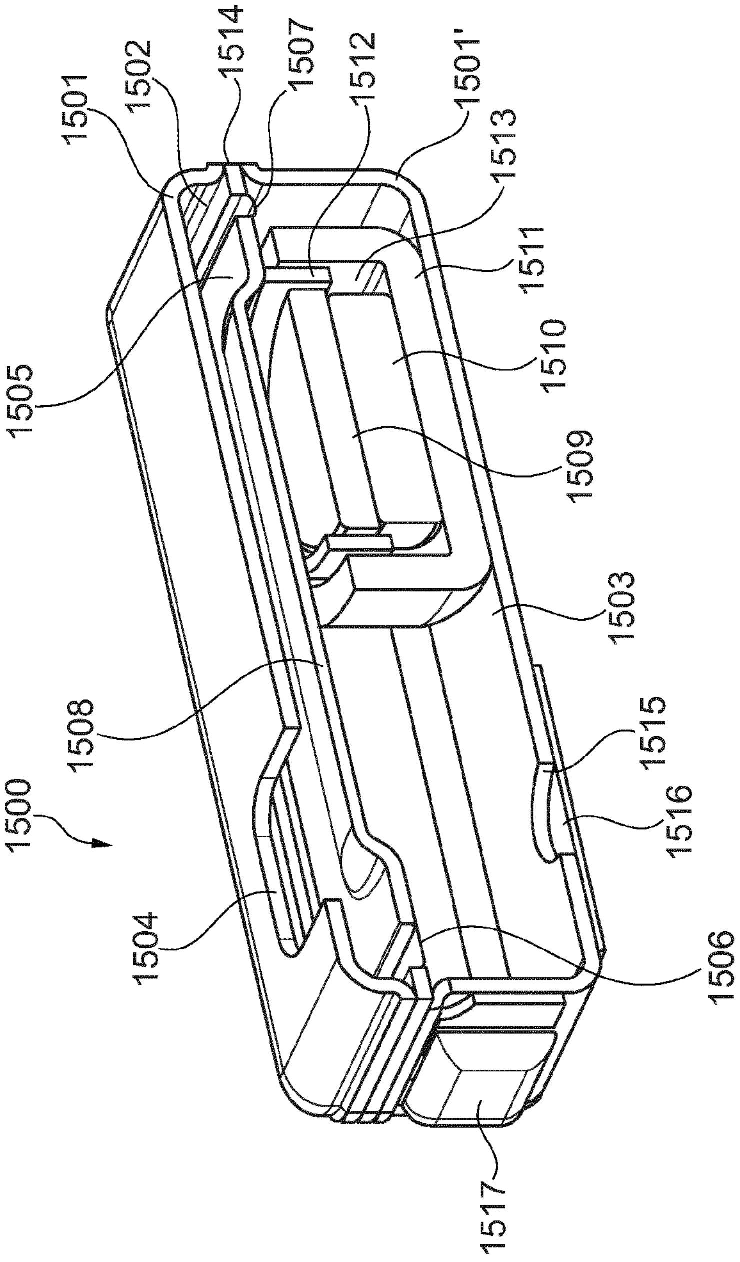
FIG. 15 shows an oblong miniature receiver comprising a hinged diaphragm and a voice coil secured thereto.

Referring now to FIG. 15 a cross-sectional side-view of an oblong miniature receiver 1500 comprising a hinged diaphragm is depicted. The oblong miniature receiver 1500 comprises a housing 1501, 1501' with a sound outlet port 1504 and a venting opening 1515 arranged therein. The venting opening 1515 has an acoustical filter 1516 having an acoustical resistance, such as an acoustical low-pass filer having an acoustical resistance in the range of 1-5 GPa·s/m$^3$, arranged therein. The properties of the acoustical resistance may be as discussed above. Within the housing 1501, 1501' of the oblong miniature receiver 1500 a front volume 1502 and a rear volume 1503 are provided. These volumes 1502, 1503 are separated by a hinged diaphragm 1505. The hinged diaphragm 1505 comprises a hinged portion and a moveable portion, wherein at least the moveable portion of the hinged diaphragm 1505 is adapted to vibrate, and thus generate sound waves, in response to a drive signal applied to a voice coil 1512 secured to the moveable portion of the hinged diaphragm 1505. As seen in FIG. 15 at least part of the hinged diaphragm 1505 comprises an embossed part 1508 for increasing the stiffness of the diaphragm and/or for providing an air venting path so that the air volume 1513 inside the magnetic motor can be vented. The magnetic motor comprises a permanent magnet 1510 sandwiched between a centre yoke 1509 and an outer yoke 1511. The centre yoke 1509 and the outer yoke 1511 form an air gap within which at least part of the voice coil 1512 is positioned.

As seen in FIG. 15 the hinged diaphragm 1505 is hinged via one or more hinges 1506 to a frame structure 1514. The hinged diaphragm 1505 and the frame structure 1514 preferably form an integrated structure of the same material, such as metal including aluminium. The hinged diaphragm 1505 and the frame structure 1514 are separated by one or more openings which are at least partly filled with a sealing member 1507, such as a corrugated polymer film or a viscoelastic gel. With the sealing member 1507 applied in the one or more openings between the hinged diaphragm 1505 and the frame structure 1514, the front and rear volumes 1502, 1503 are acoustically sealed from each other.

As also seen in FIG. 15 the length of the hinged diaphragm 1505 is significantly longer than both the width/diameter of the magnetic motor 1509, 1510, 1511 and the diameter of the voice coil 1512. In fact, the length of the hinged diaphragm 1505 is at least twice the width/diameter of the magnetic motor 1509, 1510, 1511 and the diameter of the voice coil 1512. An electrical terminal 1517 is provided on the exterior of the housing 1501, 1501'. The electrical terminal 1517 is electrically connected to the voice coil 1512 so that a drive signal can be provided thereto.

Figure 16:
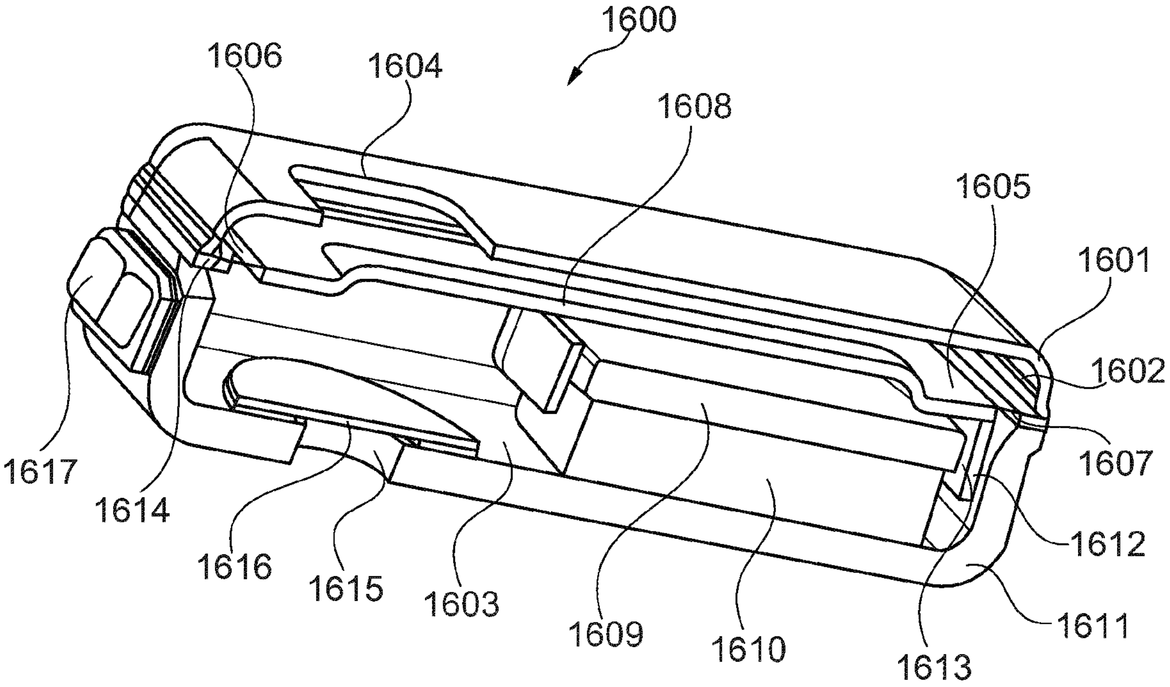
FIG. 16 illustrates a cross-sectional view of another oblong miniature receiver according to the present invention, wherein a housing part of the miniature receiver forms at least part of an outer yoke of a magnetic motor having a rectangular voice coil.

Referring now to FIG. 16, a cross-sectional side-view of an oblong miniature receiver 1600 comprising a hinged diaphragm is depicted. The oblong miniature receiver 1600 comprises a housing 1601, 1611 with a sound outlet port 1604 and a venting opening 1615 arranged therein. A part of the housing 1611 is, as depicted in FIG. 16, adapted to function as at least part of an outer yoke of a magnetic motor. As seen in FIG. 16 the magnetic motor comprises a permanent magnet 1610 sandwiched between a centre yoke 1609 and the housing part/outer yoke 1611. The centre yoke 1609 and the housing part/outer yoke 1611 form an air gap 1613 within which at least part of a voice coil 1612 is positioned. The housing part 1611 which is adapted to function as at least part of an outer yoke is typically made of a nickel/iron alloy such as mu-metal.

The venting opening 1615 comprises an acoustical filter 1616, such as a low-pass filter, having an acoustical resistance in the range of 1-5 GPa·s/m$^3$. The acoustical filter 1616 may be implemented in various ways, such as an acoustical mesh.

Within the housing 1601, 1611 of the oblong miniature receiver 1600, a front volume 1602 and a rear volume 1603 are provided. These volumes 1602, 1603 are separated by a hinged diaphragm 1605. The hinged diaphragm 1605 comprises a hinged portion closest to one or more hinges 1606 and a moveable portion, wherein at least the moveable portion of the hinged diaphragm 1605 is adapted to vibrate, and thus generate sound waves, in response to a drive signal applied to a voice coil 1612. The voice coil 1612 is secured to the moveable portion of the hinged diaphragm 1605. At least part of the hinged diaphragm 1605 comprises an embossed part 1608 for increasing the stiffness of the diaphragm.

As seen in FIG. 16 the hinged diaphragm 1605 is hinged via one or more hinges 1606 to a frame structure 1614. The hinged diaphragm 1605 and the frame structure 1614 preferably form an integrated structure of the same material, such as a metal including aluminium. The hinged diaphragm 1605 and the frame structure 1614 are separated by one or more openings which are at least partly filled with a flexible sealing member 1607, such as a (corrugated) polymer film or a viscoelastic substance, such as a viscoelastic gel. With the flexible sealing member 1607 applied in the one or more openings between the hinged diaphragm 1605 and the frame structure 1614, the front and rear volumes 1602, 1603 are acoustically sealed from each other. An electrical terminal 1617 is provided on the exterior of the oblong miniature receiver 1600, more particularly on the exterior of the housing 1601, 1611. The electrical terminal 1617 is electrically connected to the voice coil 1612 so that a drive signal can be provided thereto via the electrical terminal 1617.

As also seen in FIG. 16 the length of the hinged diaphragm 1605 is significantly longer than both the width of the inner yoke of the magnetic motor 1609 and the width of the voice coil 1612. In fact, the length of the hinged diaphragm 1605 is at least twice the width of the inner yoke of the magnetic motor 1609 and the width of the voice coil 1612. It is also seen from FIG. 16 that the inner yoke 1609 and the permanent magnet 1610 of the magnetic motor and the voice coil 1612 have a rectangular shape—the voice coil 1612 though having rounded/curved corners. The length of the hinged diaphragm 1605 is about 1.5 times the length of the voice coil 1612. Although the present invention has been discussed in the foregoing with reference to exemplary embodiments of the invention, the invention is not restricted to these particular embodiments which can be varied in many ways without departing from the invention. The discussed exemplary embodiments shall therefore not be used to construe the appended claims strictly in accordance therewith. On the contrary, the embodiments are merely intended to explain the wording of the appended claims, without intent to limit the claims to these exemplary embodiments. The scope of protection of the invention shall therefore be construed in accordance with the appended claims only, wherein a possible ambiguity in the wording of the claims shall be resolved using these exemplary embodiments.

The invention claimed is:

1. An audio assembly for a hearing device, said audio assembly comprising:

1) a nozzle comprising a sound channel and a sound outlet acoustically connected to the sound channel, wherein the sound channel, in a plan essentially perpendicular to a longitudinal axis of the sound channel, has a cross-sectional area, $A_N$, limited by a sound channel wall, and 2) a miniature receiver at least partly positioned in the sound channel, wherein the miniature receiver, in a plan essentially perpendicular to a longitudinal axis of the miniature receiver, has a cross-sectional area, $A_R$, defined by a housing of the miniature receiver, and wherein the housing of the miniature receiver comprises a sound output port and a venting opening, wherein the longitudinal axis of the sound channel and the longitudinal axis of the miniature receiver are essentially parallel when the miniature receiver is at least partly positioned in the sound channel, wherein the cross-sectional area, $A_N$, of the sound channel exceeds the cross-sectional area, $A_R$, of the miniature receiver, and wherein an excess cross-sectional area of the sound channel forms an acoustical passage defining an acoustical mass between a part of the sound channel wall and an outer housing part of the miniature receiver, and wherein the acoustical passage extends in a direction of the longitudinal axis of the sound channel, wherein the acoustical passage is acoustically connected to the sound outlet of the nozzle and to the sound output port of the miniature receiver whereby the acoustical passage is arranged between the sound outlet of the nozzle and the sound output port of the miniature receiver, and wherein the acoustical mass of the sound channel is in a range of 8000 $kg/m^4$-30000 $kg/m^4$, and wherein the venting opening is adapted to vent a rear volume of the miniature receiver.

2. The audio assembly according to claim 1, wherein the sound output port of the miniature receiver is arranged in a first oblong housing part being essentially parallel to the longitudinal axis of the miniature receiver.

3. The audio assembly according to claim 1, wherein the venting opening of the miniature receiver is arranged in a second oblong housing part being essentially parallel to the longitudinal axis of the miniature receiver.

4. The audio assembly according to claim 1, wherein the venting opening comprises an acoustical filter element forming an acoustical filter having an acoustical resistance, such as an acoustical low-pass filter having an acoustical resistance in a range of 1 $GPa \cdot s/m^3$-5 $GPa \cdot s/m^3$.

5. The audio assembly according to claim 1, wherein the miniature receiver comprises a hinged diaphragm and a voice coil secured thereto, and wherein the hinged diaphragm is adapted to deflect in response to a drive signal applied to the voice coil.

6. The audio assembly according to claim 1, wherein the sound channel of the nozzle has a substantially circular cross-sectional shape, and wherein the miniature receiver has a substantially rectangular cross-sectional shape.

7. The audio assembly according to claim 1, wherein the miniature receiver is positioned in the sound channel via a distinct joiner element, said distinct joiner element being attached to the sound channel wall and the housing of the miniature receiver via respective attachment elements.

8. The audio assembly according to claim 7, wherein the respective attachment elements comprise snap-fit attachment elements, press-fit attachment elements, click-on attachment elements and/or similar attachment elements.

9. The audio assembly according to claim 1, wherein the miniature receiver comprises one or more positioning elements in a form of one or more protruding wings and/or flanges that extend from the housing of the miniature receiver, said one or more positioning elements being adapted to engage with the nozzle in order to ensure correct positioning of the miniature receiver in the sound channel of the nozzle.

10. The audio assembly according to claim 9, wherein one or more tracks comprising respective fixation elements are provided in the sound channel wall of the nozzle, said one or more tracks and fixation elements being adapted to engage with respective positioning elements of the miniature receiver in order to ensure correct positioning and fixation of the miniature receiver in the sound channel of the nozzle.

11. The audio assembly according to claim 1, wherein the sound channel of the nozzle is dimensioned and shaped so that the miniature receiver is fitted or press-fitted into its desired position in the sound channel.

12. The audio assembly according to claim 1, wherein a sealing member is at least partly provided between the nozzle and the miniature receiver, and wherein the sealing member is at least adapted to acoustically seal the sound output port from the venting opening.

13. The audio assembly according to claim 12, wherein the sealing member forms an integral part of the miniature receiver, or wherein the sealing member is a distinct and separate member.

14. The audio assembly according to claim 1, wherein a suspension member is at least partly provided between the nozzle and the miniature receiver, and wherein the suspension member is at least adapted to vibration isolate the miniature receiver from the nozzle.

15. The audio assembly according to claim 14, wherein the suspension member forms an integral part of the miniature receiver, or wherein the suspension member is a distinct and separate member.

16. The audio assembly according to claim 1, wherein the acoustical mass of the sound channel is in a range of 10000 $kg/m^4$-25000 $kg/m^4$.

17. A hearing device comprising the audio assembly according to claim 1.

* * * * *